(12) United States Patent

Freiderich et al.

(10) Patent No.: US 12,669,441 B2

(45) Date of Patent: Jun. 30, 2026

(54) METHODS AND KITS FOR RAPID, COLORMETRIC BERYLLIUM DETECTION

(71) Applicant: Consolidated Nuclear Security, LLC, Oak Ridge, TN (US)

(72) Inventors: Melissa Ensor Freiderich, Oak Ridge, TN (US); Jesse D. Bush, Oak Ridge, TN (US); Courtney R. Huntley, Oak Ridge, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 559 days.

(21) Appl. No.: 18/137,053

(22) Filed: Apr. 20, 2023

(65) Prior Publication Data

US 2024/0353340 A1 Oct. 24, 2024

(51) Int. Cl.
| | |
|---|---|
| *G01N 21/78* | (2006.01) |
| *G01N 1/02* | (2006.01) |
| *G01N 21/29* | (2006.01) |

(52) U.S. Cl.
CPC ....... *G01N 21/78* (2013.01); *G01N 2001/028* (2013.01); *G01N 21/293* (2013.01)

(58) Field of Classification Search
CPC ........ G01N 21/77; G01N 21/78; G01N 33/20; G01N 31/22; G01N 2001/028; G01N 2001/2826; B01L 3/5029
USPC .... 436/73, 79, 164, 165, 166, 169; 422/400, 422/411, 418, 420, 430, 82.05, 82.09
See application file for complete search history.

(56) References Cited

U.S. PATENT DOCUMENTS

| | | | |
|---|---|---|---|
| 3,291,986 | A | 12/1966 | Lamb |
| 5,234,818 | A | 8/1993 | Zimmermann et al. |
| 5,403,744 | A | 4/1995 | Zimmerle |
| 5,457,200 | A | 10/1995 | Zimmermann et al. |
| 5,484,708 | A | 1/1996 | Hoenes et al. |
| 5,858,691 | A | 1/1999 | Hoenes et al. |
| 6,306,598 | B1 | 10/2001 | Charych et al. |
| 6,468,759 | B1 | 10/2002 | Charych |
| 7,129,093 | B2 | 10/2006 | McCleskey et al. |
| 7,781,589 | B2 | 8/2010 | McCleskey et al. |
| 8,450,117 | B2 | 5/2013 | Agrawal et al. |
| 8,945,931 | B2 | 2/2015 | Agrawal et al. |
| 9,851,307 | B2 | 12/2017 | Deans et al. |
| 10,557,797 | B2 | 2/2020 | Agrawal et al. |

(Continued)

FOREIGN PATENT DOCUMENTS

| | | |
|---|---|---|
| CN | 1766560 A | 5/2006 |
| CN | 102507554 A | 6/2012 |

(Continued)

OTHER PUBLICATIONS

Mulwani et al. Analyst, vol. 102, pp. 137-139, Jan. 1, 1977.*

(Continued)

*Primary Examiner* — Maureen Wallenhorst

(74) *Attorney, Agent, or Firm* — Clements Bernard Walker; Christopher L. Bernard

(57) ABSTRACT

Disclosed herein are methods and kits employing a colorimetric test wherein the presence of beryllium is indicated by a visible color change. Advantageously, according to embodiments, when the dye containing substrate contacts beryllium, the color change occurs almost instantly, allowing for rapid, near-real-time detection of beryllium without the use of complex instrumentation.

18 Claims, 3 Drawing Sheets

(56) References Cited

U.S. PATENT DOCUMENTS

| | | | | |
|---|---|---|---|---|
| 10,794,883 | B2 | 10/2020 | Roth et al. | |
| 2010/0035351 | A1* | 2/2010 | Agrawal | G01N 31/22 |
| | | | | 436/83 |
| 2014/0186965 | A1 | 7/2014 | Agrawal et al. | |
| 2020/0158638 | A1 | 5/2020 | Agrawal et al. | |
| 2024/0353340 | A1 | 10/2024 | Freiderich et al. | |

FOREIGN PATENT DOCUMENTS

| | | | |
|---|---|---|---|
| CN | 103913455 | A | 7/2014 |
| CN | 104215630 | A | 12/2014 |
| CN | 119985463 | A * | 5/2025 |
| WO | 2016196199 | A1 | 12/2016 |

OTHER PUBLICATIONS

Taylor et al., Beryllium colorimetric detection for high speed monitoring of laboratory environments, Journal of Hazardous Materials, vol. 93, Issue 3, 2002, pp. 271-283.

Tekleab et al., Onsite direct-read system for semi-quantitative detection of traces of beryllium on surfaces. Journal of Environ Monit., 2006, 8, 625-629.

Amelin et al., Test determination of aluminum, beryllium, and cationic surfactants using phenolcarboxylic acids of the triphenylmethane series immobilized on cloths from synthetic and natural fibers. J Anal Chem 62, pp. 285-290, 2007.

Mohilner P. R.,Spot Test for Beryllium Based on the Color Reaction with Eriochrome Cyanine R.,Anal. Chem., pp. 1103-1104, Jul. 1, 1963.

McWhorter et al., Colorimetric Method for Beryllium Surface Contamination Detection, pp. 1-19. 2003.

Clingenpeel et al., A comparative evaluation of the effectiveness of wipe sampling materials to remove beryllium from differently textured surfaces using zinc oxide as a surrogate, Journal of Chemical Health and Safety, vol. 26, Issue 1, 2019, pp. 15-22.

Qin et al., Toward High Sensitivity: Perspective on Colorimetric Photonic Crystal Sensors Analytical Chemistry, 2022 94 (27), pp. 9497-9507.

Lai et al., Determination of beryllium(II) on solid substrates by photothermal spectrometry after selective complexation with Chrome Azurol S, Analytica Chimica Acta, vol. 276, Issue 2, 1993, pp. 393-399.

Brisson et al., Trace-level beryllium analysis in the laboratory and in the field: State of the art, challenges, and opportunities, 2006, pp. 605-611.

Color Converter, Nix Sensor Ltd., https://www.nixsensor.com/free-color-converter/, 3 pages, undated, printed, 2022.

Sep. 2, 2025 International Search Report issued in corresponding PCT Application No. PCT/US2024/023667.

Ershova et al., Direct determination of traces of beryllium with eriochrome cyanine R by diffuse reflection spectroscopy using chromaticity functions, Fresenius Journal of analytical Chemistry, vol. 371, Sep. 19, 2001, pp. 556-558.

"Test Determination of Aluminum . . . ," Amelin, V. G. & Gan'kova, O. B., Journal of Analytical Chemistry, 2007, 62, 3, 285-290.

"Testing/Sampling and Analysis for Beryllium," Atlantic Environmental Incorporated web page, https://www.atlenv.com/sampling-and-analysis-for-beryllium, (c 2019-2023), 4 pages.

BeFinder system. Berylliant. 27). Retrieved from https://www.berylliant.com/befinder-system/, (c 2018), 3 pages.

"The Beryllium Quandary," Brisson, the synergist web page, https://synergist.aiha.org/201509-the-berylillum-quandary, (undated, printed Apr. 2023), 6 pages.

"Sampling for Beryllium Surface Contamination using Wet, Dry and Alcohol Wipe Sampling," Kerr, UNT Digital Library web page, https://digital.library.unt.edu/ark:/67531/metadc785230/, (Dec. 2004), 150 pages.

"Colorimetry Detects Beryllium," Gaughan, Photonics Media web page, https://www.photonics.com/Articles/Colorimetry_Detects_Beryllium/a10908, (Nov. 2001), 2 pages.

"Development of a New Fluorescence Method for the Detection of Beryllium on Surfaces," Minogue et al., ASTM web page, https://www.astm.org/jai13168.html, (Oct. 1, 2005), Abstract, 1 page.

"Colorimetric Paper-Based Device for Hazardous Compounds Detection in Air and Water: A Proof of Concept," De Matteis et al., Sensors 2020, 20, 5502; doi:10.3390/s20195502, 16 pages.

"New ferrocenyl naphthoquinone fused crown ether chemosensors: Highly selective, kinetically and regio controlled colorimetric, beryllium ion recognition," Alcay et al., Journal of Organometallic Chemistry, vol. 868, (Aug. 1, 2018), 131-143.

"Standardized Surface Sampling Methods for Metals," Ashley, U.S. Department of Health and Human Services Centers for Disease Control and Prevention, National Institute for Occupational Safety and Health, Cincinnati, Ohio (USA), CDC.gov web page, https://www.cdc.gov/niosh/docs/2009-133/pdfs/dream2008-surfacebio-ashley1-niosh.pdf, (undated, accessed 2022), 31 pages.

* cited by examiner

2

4

METHODS AND KITS FOR RAPID, COLORMETRIC BERYLLIUM DETECTION

STATEMENT REGARDING FEDERALLY SPONSORED RESEARCH AND/OR DEVELOPMENT

The U.S. Government has certain rights to the present disclosure pursuant to Contract No. DE-NA0001942 between the U.S. Department of Energy and Consolidated Nuclear Security, LLC.

FIELD OF THE DISCLOSURE

The present disclosure relates generally to methods and kits for beryllium (Be) detection. More specifically, the present disclosure relates to methods and kits for rapid, colorimetric beryllium detection.

BACKGROUND OF THE DISCLOSURE

Beryllium is a light-weight metal that has many applications in areas such as communications, discovery, energy, transportation, defense and security, among others. However, beryllium is a toxic metal and exposure thereto must therefore be limited. For instance, inhalation of beryllium powder can potentially cause serious lung disease and significant deterioration in breathing capacity. Thus, it is important to rapidly detect the presence of beryllium to minimize health risks.

However, a real-time or near-real-time beryllium detection method as disclosed herein does not currently exist in the marketplace to the inventors' knowledge, preventing rapid and real-time identification of beryllium. The lack of a real-time detection technique results in processing and shipment delays while waiting for smear results. For instance, when cleaning parts or areas, workers often have to wait a day or more to obtain smear results back, resulting in down time and shipping delays. Additionally, workers may over clean, wasting time and resources, because they do not have an ability to immediately detect beryllium.

The current state-of-the art method for beryllium detection includes a fluorescence method. This method requires dedicated laboratory instrumentation, reagents and staff, and has a complex, time-consuming preparation procedure. Results are typically available 12-14 hours after sampling, however, the results can also take greater than 24 hours. Fluorescence methods also can suffer from interferences in the presence of other metals.

Thus, what is still needed in the art is a novel approach for the detection of beryllium that is rapid, inexpensive and field-deployable. Embodiments of the invention address these needs and others.

BRIEF SUMMARY OF THE DISCLOSURE

In various embodiments, the present disclosure provides a novel approach for the detection of beryllium that is rapid, inexpensive and field-deployable. Disclosed herein, according to embodiments, are methods and kits employing a colorimetric test wherein the presence of beryllium is indicated by a visible color change. Advantageously, according to embodiments, when the dye containing substrate contacts beryllium, the color change occurs almost instantly, allowing for rapid, near-real-time detection of beryllium without the use of complex instrumentation. Embodiments herein provide qualitative beryllium detection methods and kits that can give workers high confidence in clean results which will greatly improve efficiency.

Thus, according to an embodiment, the present disclosure provides a method for rapidly detecting beryllium comprising: a) providing a substrate saturated with a dye solution of Chrome Azurol S (CAS) or Eriochrome Cyanine R (ECR) to form a saturated substrate, wherein the dye solution optionally comprises i) ethylenediaminetetraacetic acid (EDTA) and/or ii) Gum Arabic; b) applying an aqueous solution suspected of containing beryllium to the saturated substrate; and c) detecting a visible color change of the saturated substrate after application of the aqueous solution if beryllium is present in the aqueous solution at a concentration above a lower limit of detection, wherein the lower limit of detection is 0.002 microgram and detection of any beryllium is obtained in less than about 1 minute. The method can comprise one or more of quantifying the amount of beryllium detected using a colorimeter to obtain numerical values for the color change and not just a yes or no presence of beryllium; allowing the saturated substrate of a) to fully dry prior to applying the aqueous solution of b); forming a fully dried substrate and then proceeding to b) or storing the fully dried substrate for greater than 10 days prior to b); providing the saturated substrate of a) in a solution of ethylenediaminetetraacetic acid (EDTA) prior to b); and adding at least one of a surfactant and a buffer to the dye solution of a). The substrate can be at least one of a cotton swatch, a filter paper, a filter felt, a cotton swab, a quilted cotton square and other fabric.

According to another embodiment, the present disclosure provides a method for rapidly detecting beryllium comprising: a) providing a substrate saturated with a dye solution of Chrome Azurol S (CAS) or Eriochrome Cyanine R (ECR) to form a saturated substrate, wherein the dye solution optionally comprises ethylenediaminetetraacetic acid (EDTA); b) wiping a solid surface suspected of containing beryllium thereon with the saturated substrate; and c) after the wiping of b) or prior to the wiping of b), spraying the saturated substrate with at least one of water, a dilute acid solution or an ammonium bifluoride solution to dissolve the beryllium and obtain a visible color change of the saturated substrate if beryllium is present at a concentration above a lower limit of detection, wherein the lower limit of detection is 0.002 microgram and the detection of any beryllium is obtained in less than about 1 minute. The method can further comprise one or more of d) quantifying the amount of beryllium present with a colorimeter to obtain numerical values for the color change and not just a yes or no presence of beryllium; allowing the saturated substrate of a) to fully dry prior to the wiping of the solid surface in b); forming a fully dried substrate and storing the substrate for greater than 10 days prior to b); providing the saturated substrate of a) in a solution of ethylenediaminetetraacetic acid (EDTA) prior to b); and adding at least one of a surfactant or a buffer to the dye solution of a). The substrate can be at least one of a cotton swatch, a filter paper, a filter felt, a cotton swab, a quilted cotton square and other fabric.

According to a further embodiment, the present disclosure provides a kit configured to rapidly detect beryllium on a solid surface or in an aqueous solution comprising: a) a substrate saturated with a dye solution of Chrome Azurol S (CAS) or Eriochrome Cyanine R (ECR) forming a saturated substrate, wherein the dye solution optionally comprises ethylenediaminetetraacetic acid (EDTA); wherein an aqueous solution suspected of containing beryllium is configured to be applied to the substrate saturated with the dye solution or a solid surface suspected of containing solid beryllium thereon is configured to be wiped with the saturated substrate; wherein the kit is configured to provide a visible color change on the saturated substrate of a) if beryllium is present at a concentration above a lower limit of detection and the lower limit of detection is 0.002 microgram; and the kit is configured to detect any beryllium in less than about 1 minute. The kit can further comprise b) a colorimeter configured to quantify the amount of beryllium present to obtain numerical values for the color change and not just a yes or no presence of beryllium. The substrate can be at least one of a cotton swatch, a filter paper, a filter felt, a cotton swab, a quilted cotton square and other fabric. The saturated substrate can be fully dried and configured to be stored for greater than 10 days prior to use. The saturated substrate of a) can comprise ethylenediaminetetraacetic acid (EDTA). The dye solution of a) can further comprise at least one of a surfactant and a buffer.

BRIEF DESCRIPTION OF THE DRAWINGS

The present disclosure is illustrated and described herein with reference to the various drawings, in which like reference numbers are used to denote like article components/ method steps, as appropriate, and in which.

DETAILED DESCRIPTION

Figure 1:
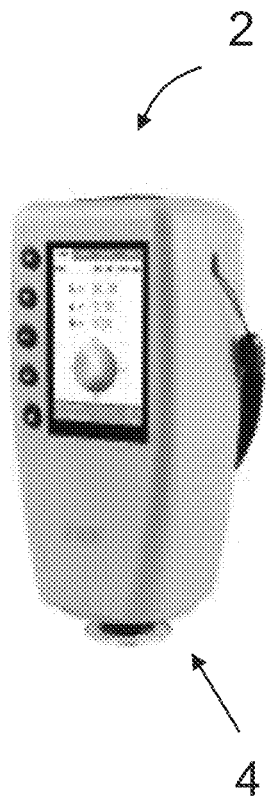
FIG. 1 is a schematic drawing illustrating an example of a portable, handheld colorimeter for use in embodiments of the present disclosure.

Again, the present disclosure provides a novel approach for the detection of beryllium that is rapid, inexpensive and field-deployable. Disclosed herein, according to embodiments, are methods and kits employing a colorimetric test wherein the presence of beryllium is indicated by a visible color change. Advantageously, according to embodiments, when the dye containing substrate contacts beryllium, the color change occurs almost instantly, allowing for rapid, near-real-time detection of beryllium without the use of complex instrumentation. Embodiments herein provide qualitative beryllium detection methods and kits that can give workers high confidence in clean results which will greatly improve efficiency.

Embodiments leverage the colorimetric reaction between beryllium and certain dyes to provide rapid, qualitative and/or quantitative results using a colorimetric indicator.

In one embodiment, a method for rapidly detecting beryllium comprises a) providing a substrate saturated with a dye solution of Chrome Azurol S (CAS) or Eriochrome Cyanine R (ECR) to form a saturated substrate, wherein the dye solution optionally comprises ethylenediaminetetraacetic acid (EDTA) and/or Gum Arabic; b) applying an aqueous solution suspected of containing beryllium to the saturated substrate; and c) detecting a visible color change of the saturated substrate after application of the aqueous solution if beryllium is present in the aqueous solution at a concentration above a lower limit of detection, wherein the lower limit of detection is 0.002 microgram; wherein the detection of any beryllium is obtained in less than about 1 minute. Optionally, the method may further include d) quantifying the amount of beryllium detected with a colorimeter to obtain numerical values for the color change and not just a yes or no presence of beryllium.

Accordingly, an embodiment includes preparation of an indicator or dye solution comprising Chrome Azurol S (CAS) or Eriochrome Cyanine R (ECR), wherein the dye solution optionally includes ethylenediaminetetraacetic acid (EDTA). Both CAS and ECR dyes experience a visible color change in the presence of beryllium. Additional components may be added to the dye solution to enhance the color response and/or prevent interference from acidic/basic media. For example, surfactants, buffers and other additives may be added to the dye solution. Buffers including acetate, succinic acid, sodium succinate, etc. may be employed to help facilitate generation of a calibration curve, as further described below. However, it has been found that buffers and surfactants are not required. Any added components should be selected so as not to interfere with beryllium. The pH of the dye solution may also be between about 4.6 to about 10, preferably about 6 to about 7. It is further noted that instead of manually adjusting the pH of the dye solutions, buffer solutions may be employed, such as ammonium hydroxide/ ammonium chloride buffer with a pH of about 10 or a sodium acetate/acetic acid buffer with a pH of about 4.6. The buffers may be used to create an all-in-one solution with the dyes and EDTA.

The desired substrate may then be saturated with the dye solution to form a saturated substrate. Any suitable substrate of desired shape and size may be employed including, but not limited to, a cotton swatch, filter paper, filter felt, cotton swab, quilted cotton square or other fabric. Preferably the substrate is flexible, absorbent, non-brittle, retains dye and has clear color changes.

The saturated substrate may also be submerged in a solution of ethylenediaminetetraacetic acid (EDTA) of any suitable amount, such as about 5 weight percent, about 10 weight percent or other suitable amount, to prevent potential interference from other metals. EDTA can complex other metals, preventing them from interacting with the dye.

Alternatively, and as noted above, the EDTA may be included in the dye solution to create and all-in-one solution approach (single dip approach) and the substrate submerged therein to form the saturated substrate.

Typically, the saturated substrate may be dried fully prior to application thereon of an aqueous solution suspected of containing beryllium. The aqueous solution may be applied directly to the saturated substrate in a desired amount. A visible color change to blue and/or purple will indicate the presence of beryllium at a concentration above the lower limit of detection, wherein the lower limit of detection is 0.002 microgram, according to embodiments. As the concentration of beryllium increases, the color continues to change.

For solid forms of beryllium (e.g., dust, metal), the dye-containing substrate or swatch may be used the same way as a dry smear to collect a sample. For example, a saturated substrate may be prepared as described above, dried, and employed to wipe a surface area suspected of being contaminated with beryllium. Then, that dye-containing substrate or swatch may be sprayed with either water, a dilute acid solution, or an ammonium bifluoride solution to dissolve the beryllium and obtain the color change. An embodiment using this technique for rapidly detecting beryllium includes: providing a substrate saturated with a dye solution of Chrome Azurol S (CAS) or Eriochrome Cyanine R (ECR), and optionally ethylenediaminetetraacetic acid (EDTA), to form a saturated substrate; wiping a solid surface suspected of containing beryllium thereon with the saturated substrate; and after wiping, spraying the saturated substrate with at least one of water, a dilute acid solution or an ammonium bifluoride solution to dissolve the beryllium and obtain a visible color change of the saturated substrate if beryllium is present at a concentration above a lower limit of detection of 0.002 microgram and the detection of any beryllium is obtained in less than about 1 minute. Alternatively, prior to wiping the surface suspected of containing beryllium, the saturated substrate can be pre-activated with the afore-referenced water, dilute acid solution or ammonium bifluoride solution.

Also, and as noted above and prior to wiping the surface, the saturated substrate may be submerged in a solution of ethylenediaminetetraacetic acid (EDTA) of any suitable amount, such as about 5 weight percent, about 10 weight percent or other suitable amount, to prevent potential interference from other metals. EDTA can complex other metals, preventing them from interacting with the dye. Alternatively, the EDTA may be included in the dye solution to create and all-in-one solution approach and the substrate submerged therein to form the saturated substrate, which is then dried and used to wipe the suspected beryllium contaminated surface.

A colorimeter may then be used to further test the sample, if desired, to obtain numerical values for the color, allowing a color calibration curve to be created. Advantageously, this can be used to quantify the amount of beryllium rather than just providing a yes or no response as to the presence of beryllium. FIG. 1 shows an example of a portable, handheld colorimeter 2 that may be used in embodiments. Colorimeters include a sensor, data processor and typically computer software.

The quantification of color may use the CIE L*a*b* color model. Defined by the Commission Internationale de l'Eclairage (CIE), the L*a*b* color model was modeled after a theory stating that two colors cannot be red and green at the same time or yellow and blue at the same time. L* indicates lightness (scale of black, 0, to white, 100); a* is the red/green coordinate (chromaticity, negative values correspond to green and positive correspond to red); and b* is the yellow/blue coordinate (chromaticity, negative values correspond to blue and positive to yellow). The a* and b* coordinates are seen as most significant as they change as the color changes.

The colorimeter can measure the number of transmitted rays of light absorbed by a specific solution. It can quantify color by measuring the three primary color components of light and display data on a digital or analog output. The colorimeter may also determine concentration of an individual component based on the amount of absorbance.

In embodiments, measurements may be taken with the colorimeter after drying. For example, the saturated substrate or strip having the aqueous solution suspected of containing beryllium applied thereon, may be dried and then positioned at lens/location 4 of the colorimeter 2 shown in FIG. 1 for testing and obtaining a readout of the afore-described values. Similarly, the saturated substrate or strip having the solid (e.g., dust) suspected of containing beryllium applied thereon, may be dried and then positioned at lens/location 4 of the colorimeter 2 shown in FIG. 1. For example, the strip may be positioned flat and placed at the bottom of the colorimeter 2 under lens/location 4, which has a hole therein. The strip may be positioned such that the hole is over the sample spot where the visible color detecting beryllium is located and the colorimeter can be operated to take a reading thereof.

Figure 2:
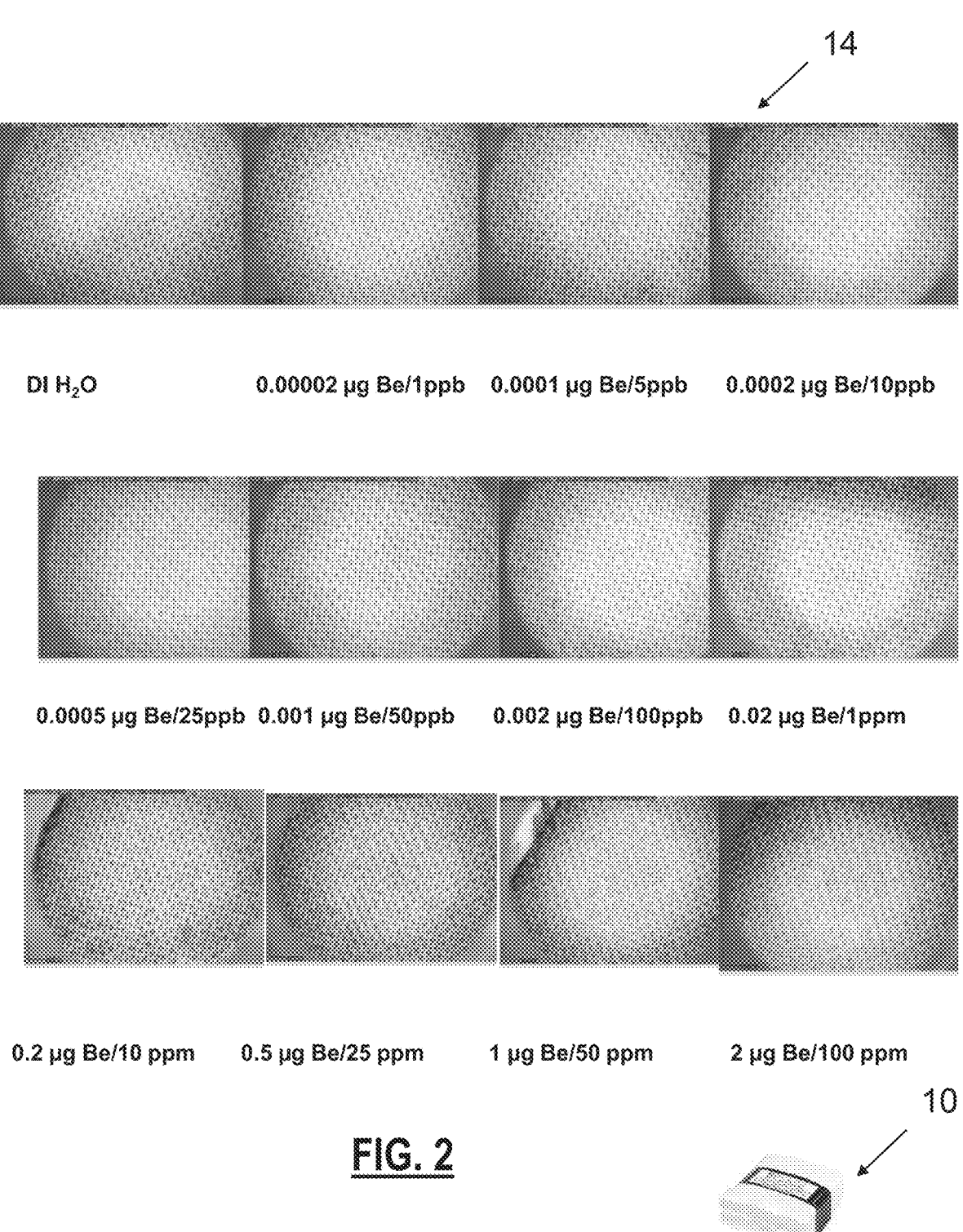
FIG. 2 illustrates test strips of various saturated substrates of embodiments of the present disclosure.

FIG. 2 illustrates test strips of various saturated substrates of embodiments of the present disclosure denoting color gradient and concentration changes. Corresponding color values (L, a, b) taken after colorimeter readings as described above are set forth in Table 1 below. More particularly, FIG. 2 illustrates test strips employing 0.1 weight percent CAS at the noted concentrations and corresponding color gradient. Table 1 below sets for the Color Values (L, a, b) from the colorimeter readings as follows:

TABLE 1

| Color Gradient With Concentration Changes Color Values (L, a, b) |
| --- |
| DI water: 65, 17.41, 10.64 |
| 0.0005 µg: 70.31, 7.73, −1.35 |
| 0.002 µg: 74.57, −1.90, −11.99 |
| 0.02 µg: 58.21, −2.07, −18.74 |
| 0.2 µg: 53.59, 7.71, −46.06 |
| 0.5 µg: 51.52, 21.55, −36.39 |
| 1 µg: 65.76, 20.88, 13.00 |

Advantageously, the colorimeter may be used for further quantification of results. For example, a range of color coordinates that correspond to a range of concentrations could be determined. Thus, if tested color coordinates fall within that range, it would indicate that the beryllium concentration regarding the tested sample is within that particular amount. Moreover, calibrations may be performed by providing a set of standard solutions of beryllium of know concentrations, applying that to the strips and taking measurements thereof. Those measurements may then be used for comparison to measurements of a particular tested sample/strip to provide the range of concentrations of beryllium for the tested sample/strip. A chart may also be created with listed color coordinates corresponding to amounts/ranges of beryllium present, which may be a useful tool to generally indicate how much beryllium is detected.

Descriptions of Examples/Testing

Dye solutions of CAS and ECR were employed for testing. Dye solutions with concentrations ranging from 0.01 wt. % to 1 wt. % were prepared for testing by adding the solid dye powders to DI water. A smear substrate was completely submerged in the dye solution using tweezers, removed, and placed in a tray to dry. Once the smear was dry, Be standard solutions (made from a Be ICP standard) ranging from 5 ppb to 100 ppm, e.g., 0.0001 µg to 2 µg, were added in 20 µL drops to the smears, and the color response was recorded using a colorimeter.

For solution preparations, various concentrations of ECR and CAS dyes were used and prepared such as follows. The dye powder would be measured using a scale and then added to a 25 mL volumetric flask. Any additive like EDTA and/or a surfactant would be measured after and added to the 25 mL volumetric flask. The last step to dye solution preparation was to add one of the following: DI water, a pH 4.6 buffer solution, or a pH 10 buffer solution into the 25 mL volumetric flask. Once the dye solution was combined and thoroughly dissolved, either by sitting in a hood for 30 minutes to an hour or 10 to 20 minutes in an ultrasonic machine, it was moved to a centrifuge tube for storage until use.

Figure 3:
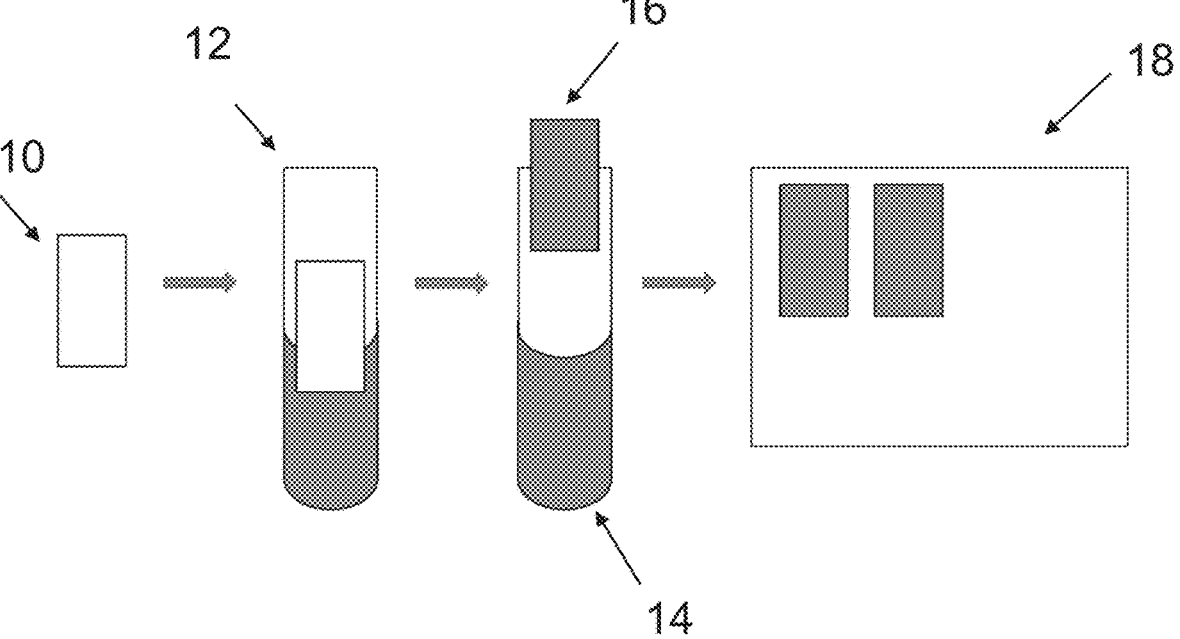
FIG. 3 is schematic diagram illustrating an embodiment of test strip preparation of the present disclosure.

Regarding the substrate, several substrates were used to load the dye. Testing of substrates included cotton squares, filter felt, filter paper, chemical resistant filter felt, and quilt squares. To load the dye solution on the substrate such as a cotton quilt square, a quilt square would be submerged into a centrifuge tube with the solution for a few seconds and then removed and placed on a plastic tray to dry under a hood. FIG. 3 schematically illustrates a diagram of test strip preparation, according to embodiments. As shown therein, substrate 10 is loaded into tube 12 comprising dye solution 14 and then the saturated substrate 16 is removed and placed on a tray 18 to dry.

Regarding test methods to prevent interference, different combinations of testing suggested that adding pH 10 buffer solution to the dye solution with 5 weight percent EDTA is effective in preventing interference from other metals while still showing a drastic color response on test strips in the presence of beryllium. The test strips included combinations of different concentrations of CAS/ECR, the presence of a buffer, a surfactant and 5 weight percent EDTA. It is noted that the combinations of CAS/ECR with 5 weight percent EDTA were especially successful in preventing a color response from the 100 ppm metals solution, which was indicated by no color response instead of a blue or purple response.

Tests were also conducted using the multi-step dipping and drying process on the test strips as described above and an all-in-one solution of the dye powder and EDTA powder being put into a 25 mL volumetric flask and then being filled to the line with either a pH 4.6 or 10 solution. Several tests also included making dye solutions with dye powder and EDTA powder and then filling up to the line in a 25 mL volumetric flask with DI water—a non-adjusted solution. Surfactants were also added into solutions, as well. Several different variable used with the solutions are set forth below in Table 2.

TABLE 2

| Concentration (%) | Dye | DI Water | pH | Surfactant | EDTA |
|---|---|---|---|---|---|
| 0.25 | ECR | Yes | N/A | 2% Gum Arabic | No |
| 0.25 | ECR | Yes | N/A | 2% Gum Arabic | Yes |
| 0.25 | ECR | No | 4.6 | 2% Gum Arabic | No |
| 0.25 | ECR | No | 4.6 | 2% Gum Arabic | Yes |
| 0.25 | ECR | No | 10 | 2% Gum Arabic | No |
| 0.25 | ECR | No | 10 | 2% Gum Arabic | Yes |
| 0.10 | CAS | Yes | N/A | 2% Gum Arabic | No |
| 0.10 | CAS | Yes | N/A | 2% Gum Arabic | Yes |
| 0.10 | CAS | No | 4.6 | 2% Gum Arabic | No |
| 0.10 | CAS | No | 4.6 | 2% Gum Arabic | Yes |
| 0.10 | CAS | No | 10 | 2% Gum Arabic | No |
| 0.10 | CAS | No | 10 | 2% Gum Arabic | Yes |

A colorimeter, such as colorimeter 2 shown in FIG. 1, can be used to measure the initial color of the test strips and the test spots of aqueous Be.

With further regard to testing, the following observations are also noted regarding the substrates, dye concentrations, pH, additives, etc. Regarding tested substrates, filter paper was a viable option because it absorbed the dye, dried within a few hours, and reflected the color change, but it became brittle after multiple dipping and drying steps. Cotton quilt squares are especially desirable as the substrate because they tend to load the dye well, and the tested areas tend to maintain their color and integrity well.

Regarding dye concentrations, 1 wt % CAS and ECR was examined, as well as additional dye concentrations from 0.05 wt % to 2 wt %. Further testing resulted in 0.25 wt % ECR and 0.1 wt % CAS being identified as optimal dye concentrations as there is enough dye present on the strips to demonstrate the color change in the presence of Be without overshadowing the change due to the intensity of the test strip color attributing to a higher dye concentration and inversely with the dye concentration being too low and would cause the color change to be too light. Thus, 0.1 wt % to 0.25 wt % of dye concentrations are particularly suitable, according to embodiments.

Regarding pH, several dye solutions were made with pH values ranging from 10-12, with ~10.5-11 being an optimal range for basic media in the testing and pH values of 3-5, with ~4-5 being the optimal range for acidic media. While the addition of either a basic or acidic buffer was deemed useful to stabilize solutions, pH 4.6 (sodium acetate/acetic acid) and 10 (ammonium hydroxide/ammonium chloride) buffer solutions were tested. However, the addition of a buffer is not necessary for the dye solutions to react in the presence of Be but can be useful in the dissolution of EDTA into the dye solutions. An especially successful showing came from a solution of 0.1% CAS with a pH 10 buffer solution and EDTA, as described above, and was very useful in preventing interference from other metals.

Regarding surfactants, surfactants were examined to aid in determining the presence of Be, as well as stability of the dye solutions. Gum Arabic was preferred over Triton X-114 and Triton X-100. All surfactants were beneficial, but gum arabic was easier to measure and better dissolve in the dye solution. It is further noted that Triton X-114 and Triton X-100 were both examined at the concentration of 2 wt %. Additionally, 5 wt % EDTA was used to help mask interferences of other metals. Any competing elements that could interfere with beryllium analysis are complexed by EDTA. Molybdenum, iron, aluminum, cadmium, zinc, chromium, copper, tin, silver, calcium, and magnesium were examined on test strips with EDTA to determine that there would be no interference when testing for beryllium.

Advantages of embodiments of the invention include real time/near real-time results for Be detection and no or non-complex instrumentation requirements. Moreover, embodiments are a cost effective solution for rapid Be detection. Embodiments of the invention demonstrate a rapid, real-time testing method for the detection of Be via colorimetry. Embodiments of the invention further demonstrate a rapid, real-time Be detection method that can employ user friendly test strips as a dry smear and activation of smear to initiate color change using DI water.

Still further, embodiments of the invention can advantageously quantify color results with a CIE L, a, b model colorimeter by, e.g., obtaining initial results of freshly prepared test strips, examining the color of the test strips via the colorimeter, and obtaining result of aqueous Be spots tested on the strips. The use of the colorimeter may further be employed to quantify results and obtain ranges for certain amounts of Be that would be present and create, e.g., a color chart denoting that if the color coordinates are of a certain amount then a particular corresponding amount of Be is detected.

Embodiments of the invention advantageously facilitate the safe handling of beryllium and meeting of workplace safety standards. Additional advantages include stability after months of aging.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes. Additionally, all disclosed features and elements can be used in any combinations, according to embodiments.

What is claimed is:

1. A method for rapidly detecting beryllium, the method comprising:

providing a substrate saturated with a dye solution including at least one of Chrome Azurol S (CAS) or Eriochrome Cyanine R (ECR) to form a saturated substrate;

contacting an aqueous solution suspected of containing beryllium with the saturated substrate, wherein the saturated substrate is dry prior to contact with the aqueous solution; and detecting a visible color change on the saturated substrate following contact with the aqueous solution on a condition that beryllium is present in the aqueous solution at a concentration above a lower limit of detection of 002 microgram, the visible color change occurring in less than about 1 minute.

2. The method of claim 1, further comprising:

determining numerical values descriptive of the color change via a colorimeter; and quantifying an amount of beryllium detected based at least in part on the numerical values.

3. The method of claim 1, wherein:

the substrate is at least one of a cotton swatch, a filter paper, a filter felt, a cotton swab, a quilted cotton square or a fabric.

4. The method of claim 1, further comprising:

storing the dried substrate for greater than 10 days prior to contacting the aqueous solution.

5. The method of claim 1, wherein:

the dye solution includes at least one of ethylenediaminetetraacetic acid (EDTA) or Gum Arabic.

6. The method of claim 5, wherein:

the dye solution includes at least one of a surfactant or a buffer.

7. A method for rapidly detecting beryllium, the method comprising:

providing a substrate saturated with a dye solution including at least one of Chrome Azurol S (CAS) or Eriochrome Cyanine R (ECR) to form a saturated substrate;

wiping a solid surface suspected of containing beryllium thereon with the saturated substrate, wherein the saturated substrate is dry prior to the wiping of the solid surface; and spraying the saturated substrate, following the wiping, with at least one of water, a dilute acid solution or an ammonium bifluoride solution to dissolve the beryllium and obtain a visible color change on the saturated substrate in less than about 1 minute on a condition that beryllium is present at a concentration above a lower limit of detection of 0.002 microgram.

8. The method of claim 7, further comprising:

determining numerical values descriptive of the color change via a colorimeter; and quantifying an amount of beryllium present based at least in part on the numerical values.

9. The method of claim 7, wherein:

the substrate is at least one of a cotton swatch, a filter paper, a filter felt, a cotton swab, a quilted cotton square or a fabric.

10. The method of claim 7, wherein:

the substrate has been stored for greater than 10 days prior to the wiping.

11. The method of claim 7, wherein:

the dye solution includes ethylenediaminetetraacetic acid (EDTA) and Gum Arabic.

12. The method of claim 11, wherein:

the dye solution includes at least one of a surfactant or a buffer.

13. A kit configured to rapidly detect beryllium, the kit comprising:

a dye solution including at least one of Chrome Azurol S (CAS) or Eriochrome Cyanine R (ECR), the dye solution configured to provide a visible color change in less than about 1 minute in the presence of beryllium at a concentration of at least 0.002 microgram; and a substrate configured to receive a portion of the dye solution to form a saturated substrate, the saturated substrate being configured to, when dry, contact a target location suspected of containing beryllium to place the dye solution in contact with the suspected beryllium.

14. The kit of claim 13, further comprising:

a colorimeter configured to quantify an amount of beryllium present via numerical values for the color change.

15. The kit of claim 13, wherein:

the substrate is at least one of a cotton swatch, a filter paper, a filter felt, a cotton swab, a quilted cotton square or a fabric.

16. The kit of claim 13, wherein:

the saturated substrate is dried; and the dried saturated substrate is configured to be stored for at least 10 days prior to use.

17. The kit of claim 13, wherein:

the dye solution includes ethylenediaminetetraacetic acid (EDTA) and Gum Arabic.

18. The kit of claim 13, wherein:

the dye solution includes at least one of a surfactant or a buffer.

* * * * *